US012679322B2

(12) United States Patent
Lee et al.

(10) Patent No.: US 12,679,322 B2
(45) Date of Patent: Jul. 14, 2026

(54) DEGRADATION LEVEL PREDICTION METHOD AND DEGRADATION LEVEL PREDICTION SYSTEM

(71) Applicants: Hyundai Motor Company, Seoul (KR); Kia Corporation, Seoul (KR); Gwangju Institute of Science and Technology, Gwangju (KR)

(72) Inventors: Kyung Woo Lee, Seoul (KR); Yong Hyun Ryu, Seoul (KR); Dae Un Sung, Incheon (KR); Hyunseok Oh, Gwangju (KR); Donghwi Yoo, Gwangju (KR); Jeongmin Oh, Gwangju (KR)

(73) Assignees: Hyundai Motor Company, Seoul (KR); Kia Corporation, Seoul (KR); Gwangju Institute of Science and Technology, Gwangju (KR)

( * ) Notice: Subject to any disclaimer, the term of this patent is extended or adjusted under 35 U.S.C. 154(b) by 140 days.

(21) Appl. No.: 18/523,078

(22) Filed: Nov. 29, 2023

(65) Prior Publication Data

US 2025/0001995 A1     Jan. 2, 2025

(30) Foreign Application Priority Data

Jun. 30, 2023     (KR) ......................... 10-2023-0084857

(51) Int. Cl.
B60T 17/22 (2006.01)
B60T 8/172 (2006.01)

(52) U.S. Cl.
CPC ............ B60T 17/221 (2013.01); B60T 8/172 (2013.01); B60T 2270/406 (2013.01)

(58) Field of Classification Search
CPC .. B60T 17/221; B60T 8/172; B60T 2270/406; G01H 17/00; G01H 1/14;
(Continued)

(56) References Cited

U.S. PATENT DOCUMENTS

2019/0391554 A1* 12/2019 Huang ................. G05B 13/027
2021/0133209 A1* 5/2021 Griffin .................... G06F 16/27

FOREIGN PATENT DOCUMENTS

CN          114021011 A * 2/2022 ............... G06N 3/02
KR     10-2020-0110530 A    9/2020
(Continued)

*Primary Examiner* — Long T Tran
*Assistant Examiner* — Charles J Brauch
(74) *Attorney, Agent, or Firm* — Banner & Witcoff, Ltd.

(57) ABSTRACT

A degradation level of a noise source is predicted by performing deep learning using frequency data indicating a vibration of the noise source during a time period and degradation data indicating degradation of the noise source during the predetermined period to determine a state estimation model. First vibration signals are measured at the noise point during a monitoring period. The first vibration signals are converted into a frequency domain, and the frequency domain converted first vibration signals are input into the state estimation model to estimate time series degradation data of degradation of the noise source during the monitoring period. A degradation prediction model is determined by deep learning using the time series degradation data. Degradation data indicating predicted degradation of the noise source during a prediction period are predicted via the degradation prediction model. A remaining useful life of the noise source may be calculated.

19 Claims, 8 Drawing Sheets

(58) Field of Classification Search
CPC ..... G01H 15/00; G06F 30/27; G06F 2119/04;
B60R 16/0234; G06N 3/0442; G06N
3/049; G06Q 50/10; B60Y 2306/15
See application file for complete search history.

(56) References Cited

FOREIGN PATENT DOCUMENTS

| KR | 10-2022-0069700 A | 5/2022 |
| KR | 10-2022-0118801 A | 8/2022 |

* cited by examiner

FIG. 8

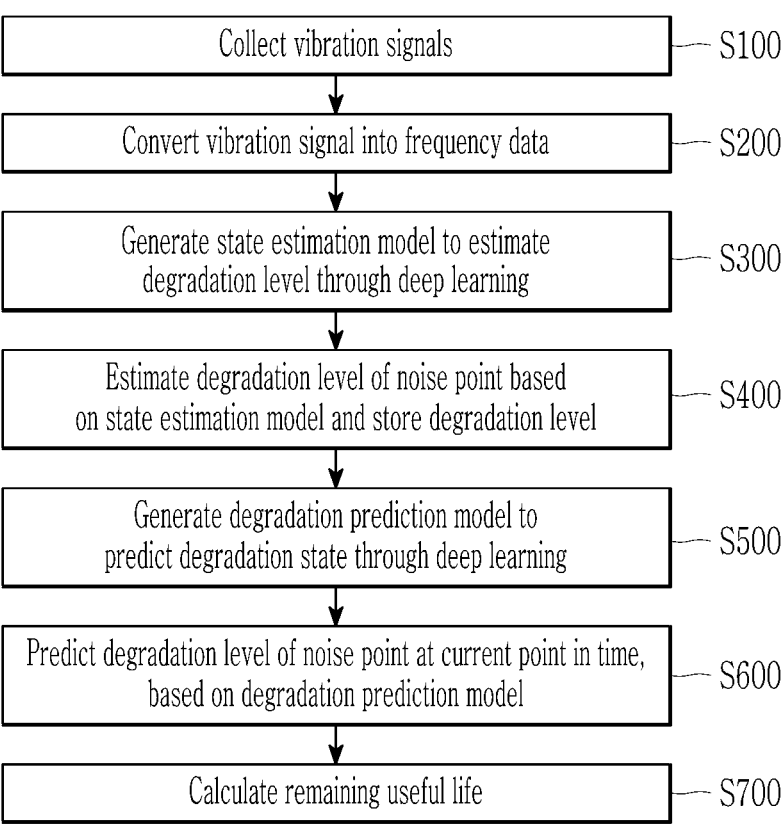

| | |
|---|---|
| Collect vibration signals | S100 |
| Convert vibration signal into frequency data | S200 |
| Generate state estimation model to estimate degradation level through deep learning | S300 |
| Estimate degradation level of noise point based on state estimation model and store degradation level | S400 |
| Generate degradation prediction model to predict degradation state through deep learning | S500 |
| Predict degradation level of noise point at current point in time, based on degradation prediction model | S600 |
| Calculate remaining useful life | S700 |

DEGRADATION LEVEL PREDICTION METHOD AND DEGRADATION LEVEL PREDICTION SYSTEM

TECHNICAL FIELD

The present disclosure a degradation level prediction method and a degradation level prediction system.

BACKGROUND

In recent years, the comfort of vehicle drivers has been regarded as important, and noise and vibration experienced by drivers may have a significant role in the merchantability of vehicles. In vehicles, a variety of noises and/or vibrations may be generated.

In particular, as a vehicle drive system deteriorates, the degradation may cause noise and/or vibration and/or changes in noise and/or vibration. It is useful to determine (e.g., detect) so as to cope with the degradation (e.g., replace, update and/or service the part).

SUMMARY

The following summary presents a simplified summary of certain features. The summary is not an extensive overview and is not intended to identify key or critical elements.

Systems, apparatuses, and methods are described for degradation level prediction. A method may comprise determining a state estimation model by performing deep learning using: a plurality of frequency data items indicating a plurality of vibrations of a noise source during a predetermined period, and a plurality of degradation data items indicating corresponding degrees of degradation of the noise source during the predetermined period; measuring a plurality of first vibration signals, from the noise source, at a noise point during a monitoring period; estimating time series degradation data indicating degrees of degradation of the noise source during the monitoring period by inputting a plurality of first frequency data items, obtained by converting the plurality of first vibration signals into a frequency domain, into the state estimation model; determining a degradation prediction model by performing deep learning using the time series degradation data; predicting, based on the degradation prediction model, degradation data indicating degrees of degradation of the noise source at at least one target point in time within a prediction period later than the monitoring period; and calculating, based on the time series degradation data and the degradation data at the target point in time a remaining useful life of the noise source.

Also, or alternatively, a degradation level prediction system may comprise an input unit configured to acquire vibration signals from a noise point configured to measure noise from a noise source; an estimation model learning unit configured to determine a state estimation model by performing deep learning using: a plurality of frequency data items indicating a plurality of vibrations of the noise point during a predetermined period, and a plurality of degradation data items indicating degrees of degradation of the noise source during the predetermined period; and a controller configured to: measure a plurality of first vibration signals at the noise point during a monitoring period, estimate, by inputting a plurality of first frequency data items into the state estimation model, time series degradation data indicating degrees of degradation of the noise source during the monitoring period, wherein the plurality of first frequency data items are obtained by converting the plurality of first vibration signals into a frequency domain, predict, via a degradation prediction model performing deep learning using the time series degradation data, degradation data indicating a degree of degradation of the noise source at at least one target point in time within a prediction period later than the monitoring period, and calculate, based on the time series degradation data and the predicted degradation data at the at least one target point in time, the remaining useful life of the noise source.

These and other features and advantages are described in greater detail below.

BRIEF DESCRIPTION OF THE DRAWINGS

FIG. 8 is a flow chart of a degradation level prediction method according to an example.

DETAILED DESCRIPTION

Hereinafter, examples in this specification will be described in detail with reference to the accompanying drawings. The same or similar constituent components are denoted by the same or similar reference symbols, and a repeated description thereof will not be made. As used herein, the suffix 'module' and/or the suffix 'unit' for constituent elements are given and used interchangeably in consideration of only ease of preparing this specification, and the suffixes themselves do not have meanings or roles distinguishable from each other. Further, when describing examples disclosed in this specification, detailed descriptions of known technologies will be omitted if it is determined that specific description thereof may obscure the gist of the examples disclosed in this specification. Furthermore, the accompanying drawings are provided for helping to easily understand examples disclosed in the present specification, and the technical spirit disclosed in the present specification is not limited by the accompanying drawings, and it will be appreciated that the present disclosure includes all of the modifications, equivalent matters, and substitutes included in the spirit and the technical scope of the present disclosure.

Terms including an ordinal number, such as first and second, are used for describing various constituent elements, but the constituent elements are not limited by the terms. The terms are used only to discriminate one constituent element from another constituent element.

In the present application, it will be appreciated that terms "comprising," "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

In a component for controlling other components under a specific control condition according to an example, a program implemented as a set of commands specifying a control algorithm necessary to control the other components may be installed. The control component may generate output data by processing input data and/or stored data according to the program (e.g., a stored and/or installed program). The control component may include a non-volatile memory for storing programs and a memory for storing data. Instructions for implementing the program may be stored in a non-transitory computer readable storage medium (e.g., in the non-volatile memory.

Disclosed herein are methods, apparatuses and/or systems for determining and/or predicting future degradation in one or more components of a vehicle and/or for determining and/or predicting the remaining useful life of the vehicle drive system.

Figure 1:
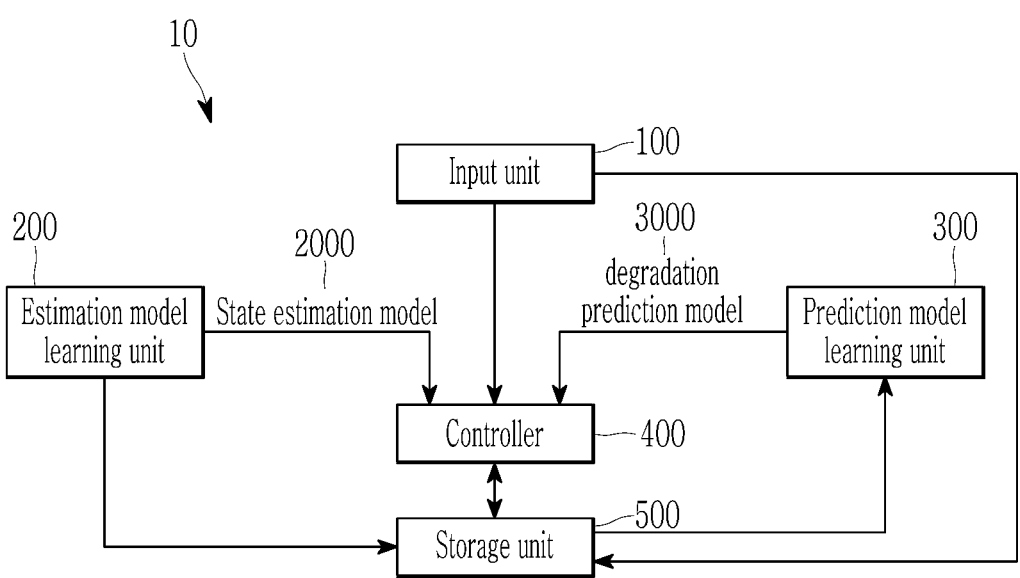
FIG. 1 is a block diagram schematically illustrating a degradation level prediction system according to an example.

FIG. 1 is a block diagram schematically illustrating a degradation level prediction system according to an example.

A degradation level prediction system 10 according to an example of the present disclosure may comprise a computer system for implementing various examples to be described in this specification. Specifically, the degradation level prediction system 10 may include at least one processor and a memory, and the memory may contain computer-readable instructions, and at least one processor may be configured to execute the instructions stored in the memory, whereby various examples to be described in this specification can be implemented.

A "processor" may refer to a device for processing arithmetic operations, logic operations, determining operations, etc., to provide at least one function. The processor may be implemented in the form of hardware, software, or a combination of hardware and software. For example, a processor may be implemented in the form of software executable in a predetermined area of a memory, such as a task, a class, a subroutine, a process, an object, an execution thread, and a program, or in the form of hardware such as a field-programmable gate array (FPGA) and an application-specific integrated circuit (ASIC), or in the form of a combination of software and the hardware. The processor may be contained on a computer-readable storage medium, and/or may be distributed across a plurality of computers.

For example, the degradation level prediction system 10 may be implemented in the form of a supercomputer, a server, a mainframe, a workstation, a personal computer, a laptop computer, a tablet computer, an embedded computer, a wearable computer, etc. The degradation level prediction system 10 may comprise an output device and/or component configured to output one or more results (e.g., an indication and/or notification of degradation level and/or lifetime of a vehicle component), as discussed herein. However, the scope of the present disclosure is not limited thereto, and the degradation level prediction system 10 may be any computing device capable of implementing various functions/methods described in this specification.

The degradation level prediction system 10 may be implemented in the form of a single computing device, or may be implemented in the form of a plurality of computing devices.

If a vehicle is driven, noise may be generated in various parts. At least one noise generation point in a vehicle (hereinafter, referred to as a "noise source") may indicate various points in the vehicle where noise may be generated, such as parts of the vehicle drive system, and for example, a noise source may be the motor reducer, the brake, a tire, or the like, of the vehicle.

Hereinafter, for ease of explanation, a point located within a predetermined range (e.g., in, on, within a predetermined distance) from the location of a part corresponding to the noise source (for example, the motor reducer of the vehicle, etc.) will be referred to as a "noise point."

In this specification, the degradation level prediction system 10 is described as predicting the degradation level of a vehicle, but the disclosure is not limited thereto. The degradation level prediction system 10 may be used to predict a degradation level of any other motorized device.

The degradation level prediction system 10 may acquire vibration signals of a noise point at n number of points in time (wherein n is a natural number greater than or equal to 2), estimate the degradation levels of the noise point (and/or noise source) from data indicated by the vibration signals of the noise point, on the basis of deep learning, and/or predict the degradation level of the noise source at a target point in time in the future, on the basis of time series data indicating the degradation levels of the noise source from the past to the current. Hereinafter, the current point in time may refer to the latest point in time among the n number of points in time indicated by the vibration signals of the noise point acquired by the degradation level prediction system 10, and a target point in time may include at least one point in time that falls within a predetermined prediction period after the current point in time for which it is required to predict the degree of degradation of the noise point (and/or noise source).

Deep learning may be implemented via various models, such as convolutional neural network (CNN) models, multi-layer perceptron (MLP) models, deep neural network regression models, long short-term memory (LSTM) models, etc. Convolutional neural network models may extract a feature map from data, and/or simplify (reduce) the feature map, and/or convert the dimension of the simplified feature map into a one-dimensional vector through a flatten layer in order to perform a learning process.

Further, the degradation level prediction system 10 may estimate whether the degradation level of a noise source (for example, the motor reducer) is normal or abnormal, from vibration signals associated with the noise point in a deep neural network classifier, and/or determine what the degradation level is, if the degradation level is abnormal.

For example, the degradation level prediction system 10 may determine what the degradation level of the motor reducer of the vehicle at a target point in time in the future will be, from data indicating the vibration of noise generated from the motor reducer of the vehicle.

Referring to FIG. 1, the degradation level prediction system 10 may include an input unit 100, an estimation model learning unit 200, a prediction model learning unit 300, a controller 400, and/or a storage unit 500. The input unit 100, the estimation model learning unit 200, the prediction model learning unit 300, the controller 400 and/or the storage unit 500 may be implemented as one or more processors and memory storing instructions that, when executed by the one or more processors, cause the fault diagnosis system 10 to perform one or more operations described herein.

At least one sensor mounted at a noise point in the vehicle may measure a vibration signal (e.g., at that noise point). For example, an acceleration sensor located at a noise point in the vehicle may generate three-axis data indicating vibration signals related to the x-axis, y-axis, and z-axis The input unit 100 may acquire vibration signals measured at a noise point, corresponding to (e.g., configured to detect vibrations of) a noise point generating the vibration signals, from at least one sensor. Specifically, the input unit 100 may acquire vibration signals from at least one sensor within a predetermined range from a noise source corresponding to the noise point. Vibration signals acquired by the input unit 100 acquires may be measured and/or acquired in real time.

Vibration signals measured at the noise point may be time series data. For example, a vibration signal measured at the noise point may contain data indicating vibration measured for each unit time during a predetermined monitoring period from point $t\_0$ in time to point $t\_n$ in time later than point $t\_0$ in time. The point $t\_0$ in time may be the initial point in time at which at least one sensor started collecting vibration signals, and the point $t\_n$ in time may be the current point in time. Hereinafter, for ease of explanation, point $t\_m$ in time (wherein m is a natural number greater than 1) may be a point in time later than the point $t\_1$ in time by (m−1) times the unit time. For example, if the unit time is 1 hour, point $t\_5$ in time may be a point in time later than the point $t\_1$ in time by 4 hours.

The input unit 100 may receive (e.g., from an external device) data indicating information on the state of the noise point corresponding to a point in time at which one or more sensors measure vibration signals. Herein, failure information may include data indicating the type of failure (degradation) in the vehicle, the existence or non-existence of failure, the degree of failure, etc.

For example, the input unit 100 may acquire (e.g., from an external device) data indicating failure information (e.g., at and/or on the motor reducer in the vehicle) at a first point in time at which a first vibration signal is measured.

However, the disclosure is not limited thereto. The storage unit 500 may contain (e.g., store) vibration signals collected from the noise point and/or data indicating information on the state of the noise point at the time of measurement of each vibration signal. For example, the storage unit 500 may contain a vibration signal indicating noise at the motor reducer of a vehicle of model A, which is a noise source in model A, and/or data indicating failure information on the motor reducer of the vehicle at the time of measurement of the vibration signal.

Hereinafter, for ease of explanation, it is assumed that the controller 400 acquires vibration signals and data indicating corresponding failure information from the input unit 100.

The controller 400 may receive vibration signals acquired by the input unit 100.

The controller 400 may convert one or more (e.g., each) of the vibration signals collected from a noise point into data in a frequency domain. The manner in which the controller 400 converts vibration signals into data in a frequency domain may be realized through fast Fourier transform (FFT).

Hereinafter, for ease of explanation, data in a frequency domain into which the controller 400 coverts a vibration signal at a noise point will be referred to as noise point data. The controller 400 may store, in the storage unit 500, noise point data corresponding to vibration signals at a noise point which are acquired in real time.

Hereinafter, noise point data may be associated with data indicating information on the state of the noise point at the time of measurement of the noise point data. For example, data indicating failure information on the motor reducer in the vehicle at a first point in time may be associated with noise point data indicating vibration at the first point in time.

The estimation model learning unit 200 may acquire noise point data from the storage unit 500. Noise point data which is acquired by the estimation model learning unit 200 may be data labeled with the state information of the noise point corresponding to the time of measurement. Some of data labeled with the state information of the noise point corresponding to the points in time at which the vibration signals were measured at the noise point may be a learning dataset, and others may be a test dataset.

The estimation model learning unit 200 may generate a state estimation model 2000 on the basis of the noise point data labeled with the state information of the noise point, and/or may train the state estimation model, by deep learning. The state estimation model 2000 may be implemented in the form of a CNN model, an MLP model, a deep neural network regression model, etc.

The estimation model learning unit 200 may train the state estimation model 2000 using the learning dataset. The estimation model learning unit may test the state estimation model 2000, using the test dataset. The state estimation model 2000 may be implemented via a regression model for predicting the life of the noise source corresponding to the noise point. The state estimation model 2000 may use the learning dataset to learn a method of predicting the state information of the noise point from data indicating vibration of the noise point through deep learning.

The estimation model learning unit 200 may provide frequency data indicating vibration measured from the noise point at a first point in time, to the state estimation model 2000, and/or derive an error between prediction data output from the state estimation model 2000 and the degree of degradation of the noise source at the first point in time, and/or modify the state estimation model 2000 based on the derived error.

The state estimation model 2000 may be a transfer function configured to output the state information of the noise point based on frequency data indicating vibration of the noise point as an input. The state estimation model 2000 may perform learning so as to be configured to output the state information of the noise point based on the frequency data indicating the vibration of the noise point as an input.

Hereinafter, for ease of explanation, the learned and/or tested state estimation model 2000 will be referred to as the learned state estimation model 2000.

The estimation model learning unit 200 may provide the learned state estimation model 2000 to the controller 400.

The controller 400 may control the operations of the input unit 100, the estimation model learning unit 200, the prediction model learning unit 300, and/or the storage unit 500. The controller 400 may be implemented in the form of hardware, or in the form of software, or in the form of a combination of hardware and software. The controller 400 may be implemented in the form of a processor (e.g., a microprocessor).

The controller 400 may perform control on the overall process of learning and testing of the estimation model learning unit 200. The controller 400 may use the learned state estimation model 2000 to perform control of the process of detecting, based on the data indicating the vibration of the noise point, data indicating the degree of degradation of the noise source at the time of measurement of the vibration signal.

The controller 400 may estimate, via the learned state estimation model 2000 and based on the data indicating the vibration measured at the noise point at an arbitrary point in time, data indicating the degree of degradation of the noise source. Therefore, if the learned state estimation model 2000 receives frequency data indicating vibrations measured for each of n number of unit times falling within a predetermined monitoring period (e.g., from the point t_0 in time to the point t_n in time, hereinafter, referred to as "time series frequency data"), it may estimate data indicating the degrees of degradation of the noise source corresponding to the n number of unit times falling within the monitoring period from the point t_0 in time to the point t_n in time (hereinafter, referred to as "time series degradation data"). Here, n may be the number of unit times. For example, if the predetermined period is 10 hours and each unit time is 1 hour, each of the time series frequency data and the time series degradation data may include data items corresponding to 10 points in time.

The controller 400 may input the time series frequency data to the learned state estimation model 2000, and store the time series degradation data estimated by the state estimation model 2000, in the storage unit 500. The storage unit 500 may store the time series degradation data in real time.

For example, the storage unit 500 may store the degree of degradation of the noise source estimated at the point t_1 in time by the state estimation model 2000, and store the degree of degradation of the noise source estimated at the point t_2 in time later than the point t_1 in time by the state estimation model 2000.

The storage unit 500 may include storage media of at least one type of storage media among memories of flash memory type, hard disk type, micro type, card type (for example, Secure Digital cards (SD cards) or eXtream Digital cards (xD cards), etc., and memories of random access memory (RAM) type, static RAM (SRAM) type, read-only memory (ROM) type, programmable ROM (PROM) type, electrically erasable PROM (EEPROM) type, magnetic RAM (MRAM) type, magnetic disk type, and optical disk type.

The controller 400 may predict the degree of degradation of the noise source at a target point in time later than the point in time at which a vibration signal was measured, on the basis of the data indicating the estimated degree of degradation of the noise source. The controller 400 may use a degradation prediction model 3000 generated by the prediction model learning unit 300 to predict the degree of degradation of the noise source at a target point in time.

The degradation prediction model 3000 may be implemented in the form of an LSTM model, etc.

The prediction model learning unit 300 may acquire the time series degradation data from the storage unit 500. The prediction model learning unit 300 may use the time series degradation data to train the degradation prediction model 3000. The degradation prediction model 3000 may contain a plurality of LSTM blocks, and each of the plurality of LSTM blocks may include a plurality of LSTM cells. The degradation prediction model 3000 may learn a feature of data (history) over time indicated by the time series degradation data.

The degradation prediction model 3000 may input the time series degradation data corresponding to the n number of points in time falling within the monitoring period from the point t_0 in time to the point t_n in time to cells corresponding to the points in time among a plurality of LSTM cells belonging to one of the plurality of LSTM blocks, through deep learning.

The degradation prediction model 3000 may learn the degradation history of the noise source from the time series degradation data corresponding to the n number of points in time falling within the monitoring period from the point t_0 in time to the point t_n in time through the plurality of LSTM cells belonging to each of the plurality of LSTM blocks, and predict the degree of degradation of the noise source corresponding to a target point in time later than the point t_n in time, on the basis of the degradation history.

From time series data corresponding to a plurality of consecutive points in time (for example, a plurality of points in time falling within the monitoring period from the point t_0 in time to the point t_n in time), the degradation prediction model 3000 may predict data indicating the degree of degradation of the noise source at a point in time later than the plurality of points in time (for example, a target point in time later than the point t_n in time which is the final point in time in the monitoring period). The degradation prediction model 3000 may be a transfer function that outputs the degree of degradation of the noise source corresponding to a target point in time later than the point t_n in time at which taking the time series degradation data. The degradation prediction model 3000 may use the time series degradation data to learn how to predict the degree of degradation of the noise source corresponding to each target point in time falling within a prediction period later than the point t_n in time through deep learning.

The prediction model learning unit 300 may provide the learned degradation prediction model 3000 to the controller 400.

The controller 400 may perform control on the overall learning process of the prediction model learning unit 300. The controller 400 may use the learned degradation prediction model 3000 to perform control in the process of detecting data indicating the degree of degradation of the noise source at a point in time later than the points in time indicated by the time series degradation data, from the time series degradation data. The controller 400 may predict data indicating the degree of degradation of the noise source at a target point in time, at the noise point, through the learned degradation prediction model 3000.

The controller 400 may input the data indicating the degrees of degradation of the noise source corresponding to the unit times belonging to the monitoring period from the point t_0 in time to the point t_n in time, to the learned degradation prediction model 3000, and derive the degree of degradation of the noise source corresponding to a target point in time later than the point t_n in time, from the degradation prediction model 3000, and store the derived data in the storage unit 500.

The storage unit 500 may store the vibration signals of the noise source acquired by the input unit 100, the learned state estimation model 2000, and the learned degradation prediction model 3000. The storage unit 500 may store the time series degradation data, and data indicating the degree of degradation of the noise source at the target point in time predicted by the state estimation model 2000.

Figure 2:
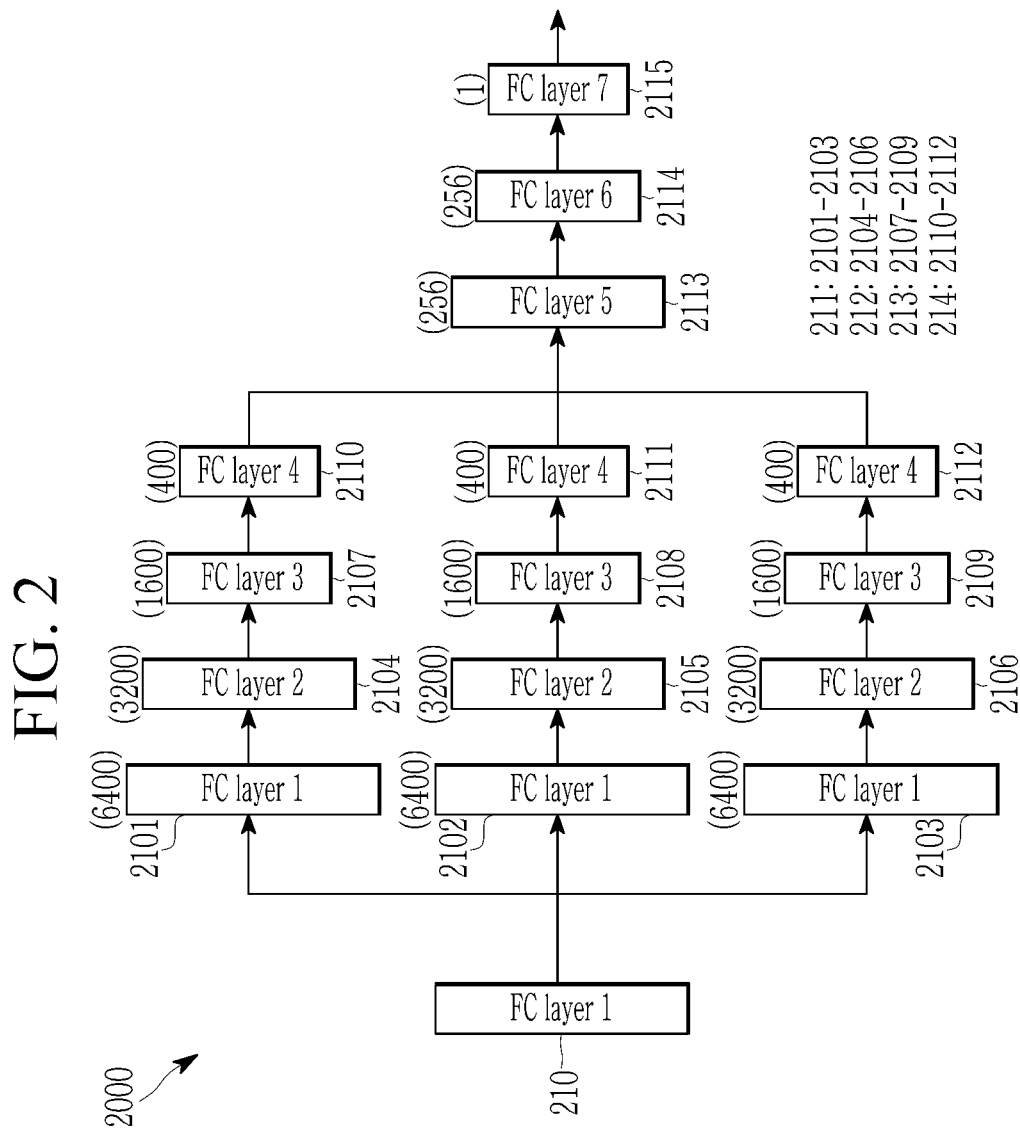
FIG. 2 is a drawing illustrating an example of a state estimation model in the degradation level prediction system according to the example.

FIG. 2 is a drawing illustrating an example of a state estimation model in the degradation level prediction system according to the example.

Referring to FIG. 2, the state estimation model 2000 may contain a plurality of FC layers 211 to 214 and a plurality of layers 2113 to 2115.

The estimation model learning unit 200 may train the state estimation model 2000 by inputting time series frequency data 201 to the state estimation model 2000.

The time series frequency data 201 may include a plurality of noise point frequency data items corresponding to the vibration signals actually measured at the noise point, and labeling data items indicating the state information of the noise source at the times of measurement of the vibration signals, and the labeling data items may be associated with the corresponding noise point frequency data items, respectively. Each of the plurality of noise point frequency data items may include data on a two-dimensional 3-by-m matrix corresponding to three axes (x-axis, y-axis, and z-axis) (wherein m is a natural number greater than 1). For example, the time series frequency data 201 may be a two-dimensional 3-by-2048 matrix.

The first FC layer 211 may include a plurality of layers 2101 to 2103. The plurality of layers 2101 to 2103 may have one weight and one bias. To each of the plurality of layers 2101 to 2103, data corresponding to one axis among the time series frequency data 201 may be input.

The following description will be described on the assumption that the time series frequency data 201 having a two-dimensional 3-by-2048 size is input to the first FC layer 211. To the layer 2101, a one-dimensional 2048-bit vector indicating a first row corresponding to the x-axis among the time series frequency data 201 may be input. To the layer 2102, a one-dimensional 2048-bit vector indicating a second row corresponding to the y-axis among the time series frequency data 201 may be input. To the layer 2103, a one-dimensional 2048-bit vector indicating a third row corresponding to the z-axis among the time series frequency data 201 may be input.

Each of the plurality of layers 2101 to 2103 may have a predetermined number of nodes, and perform a matrix calculation on input data, and output data corresponding to the number of nodes. For example, each of the plurality of layers 2101 to 2103 may have 6400 nodes, and the layer 2101 may output a one-dimensional 6400-bit vector related to the x-axis, and the layer 2102 may output a one-dimensional 6400-bit vector related to the y-axis, and the layer 2103 may output a one-dimensional 6400-bit vector related to the z-axis.

The second FC layer 212 may include a plurality of layers 2104 to 2106. The plurality of layers 2104 to 2106 may have one weight and one bias. To each of the plurality of layers 2104 to 2106, the output of a corresponding layer among the plurality of layers 2101 to 2103 may be input. For example, to the layer 2104, the output of the layer 2101 may be input. To the layer 2105, the output of the layer 2102 may be input. To the layer 2106, the output of the layer 2103 may be input.

Each of the plurality of layers 2104 to 2106 may have a predetermined number of nodes, and perform a matrix calculation on input data, and output data corresponding to the number of nodes. For example, each of the plurality of layers 2104 to 2106 may have 3200 nodes, and the layer 2104 may output a one-dimensional 3200-bit vector related to the x-axis, and the layer 2105 may output a one-dimensional 3200-bit vector related to the y-axis, and the layer 2106 may output a one-dimensional 3200-bit vector related to the z-axis.

The third FC layer 213 may include a plurality of layers 2107 to 2109. The plurality of layers 2107 to 2109 may have one weight and one bias. To each of the plurality of layers 2107 to 2109, the output of a corresponding layer among the plurality of layers 2104 to 2106 may be input. For example, to the layer 2107, the output of the layer 2104 may be input.

To the layer 2108, the output of the layer 2105 may be input. To the layer 2109, the output of the layer 2106 may be input.

Each of the plurality of layers 2107 to 2109 may have a predetermined number of nodes, and perform a matrix calculation on input data, and output data corresponding to the number of nodes. For example, each of the plurality of layers 2107 to 2109 may have 1600 nodes, and the layer 2107 may output a one-dimensional 1600-bit vector related to the x-axis, and the layer 2108 may output a one-dimensional 1600-bit vector related to the y-axis, and the layer 2109 may output a one-dimensional 1600-bit vector related to the z-axis.

The fourth FC layer 214 may include a plurality of layers 2110 to 2112. The plurality of layers 2110 to 2112 may have one weight and one bias. To each of the plurality of layers 2110 to 2112, the output of a corresponding layer among the plurality of layers 2107 to 2109 may be input. For example, to the layer 2110, the output of the layer 2107 may be input. To the layer 2111, the output of the layer 2108 may be input. To the layer 2112, the output of the layer 2109 may be input.

Each of the plurality of layers 2110 to 2112 may have a predetermined number of nodes, and perform a matrix calculation on input data, and output data corresponding to the number of nodes. For example, each of the plurality of layers 2110 to 2112 may have 400 nodes, and the layer 2110 may output a one-dimensional 400-bit vector related to the x-axis, and the layer 2111 may output a one-dimensional 400-bit vector related to the y-axis, and the layer 2112 may output a one-dimensional 400-bit vector related to the z-axis.

The estimation model learning unit 200 may normalize the outputs of the plurality of layers 2110 to 2112, and flatten the normalized outputs into one-dimensional data, and input the one-dimensional data to the layer 2113. For example, to the layer 2113, a one-dimensional 1200-bit vector obtained by flattening the one-dimensional 400-bit vector output from the layer 2110, the one-dimensional 400-bit vector output from the layer 2111, and the one-dimensional 400-bit vector output from the layer 2112 may be input.

Each of the plurality of layers 2113 to 2115 may have a predetermined number of nodes, and perform a matrix calculation on input data, and output data corresponding to the number of nodes. For example, the layer 2113 may include 256 nodes and output one-dimensional 256-bit vector, and the layer 2114 may include 256 nodes and output one-dimensional 256-bit vector, and the layer 2115 may include 1 node and output one-dimensional 1-bit vector.

Data which is output from the layer 2115 may indicate the degree of failure of the noise source. For example, if data which is output from the layer 2115 is 0, it may indicate that the motor reducer is normal, and if data which is output from the layer 2115 falls within a range larger than 0 and equal to or smaller than 0.04, it may indicate that the motor reducer is in a first degradation level, and if data which is output from the layer 2115 falls within a range larger than 0.04 and equal to or smaller than 0.28, it may indicate that the motor reducer is in a second degradation level, and if data which is output from the layer 2115 falls within a range larger than 0.28 and equal to or smaller than 1, it may indicate that the motor reducer is in a third degradation level. In this case, the first degradation level indicates a lower degree of degradation as compared to the second degradation level, and the second degradation level indicates a lower degree of degradation as compared to the third degradation level.

The estimation model learning unit 200 may compare prediction data output from the layer 2115 if a first data item among the plurality of noise point frequency data items was input to the state estimation model 2000, with a labeling data item corresponding to the first data item among the learning dataset. The output of the layer 2115 may be the output of the state estimation model 2000.

The estimation model learning unit 200 may derive an error between the prediction data output from the state estimation model 2000 and the labeling data item, and output the state estimation model 2000 based on the derived error.

For example, the estimation model learning unit 200 may train the plurality of FC layers 211 to 214 and the plurality of layers 2113 to 2115 such that a loss function value indicating the difference between prediction data which is output from the layer 2115 and labeling data is minimized.

Further, the estimation model learning unit 200 may test the state estimation model 2000 by inputting the test dataset including the time series frequency data 201 to the state estimation model 2000.

The estimation model learning unit 200 may predict the degree of failure of the noise source that is indicated by each of the plurality of noise point frequency data items, through the state estimation model 2000.

The estimation model learning unit 200 may provide the state estimation model 2000 generated through deep learning, to the controller 400. The storage unit 500 may store the learned state estimation model 2000.

In this way, the controller 400 may provide the learning dataset and the test dataset to the estimation model learning unit 200, and receive the state estimation model 2000 from the estimation model learning unit 200.

The controller 400 may receive the time series frequency data to the learned state estimation model 2000, and acquire the time series degradation data corresponding to the time series frequency data.

If the learned state estimation model 2000 receives noise point data, it may estimate the degree of degradation of the noise source corresponding to the noise point data. The storage unit 500 may store the degree of degradation of the noise source output from the state estimation model 2000.

Further, if the learned state estimation model 2000 receives the time series frequency data, it may estimate time series degradation data corresponding to the time series frequency data. The storage unit 500 may store the time series degradation data output from the state estimation model 2000.

Figure 3:
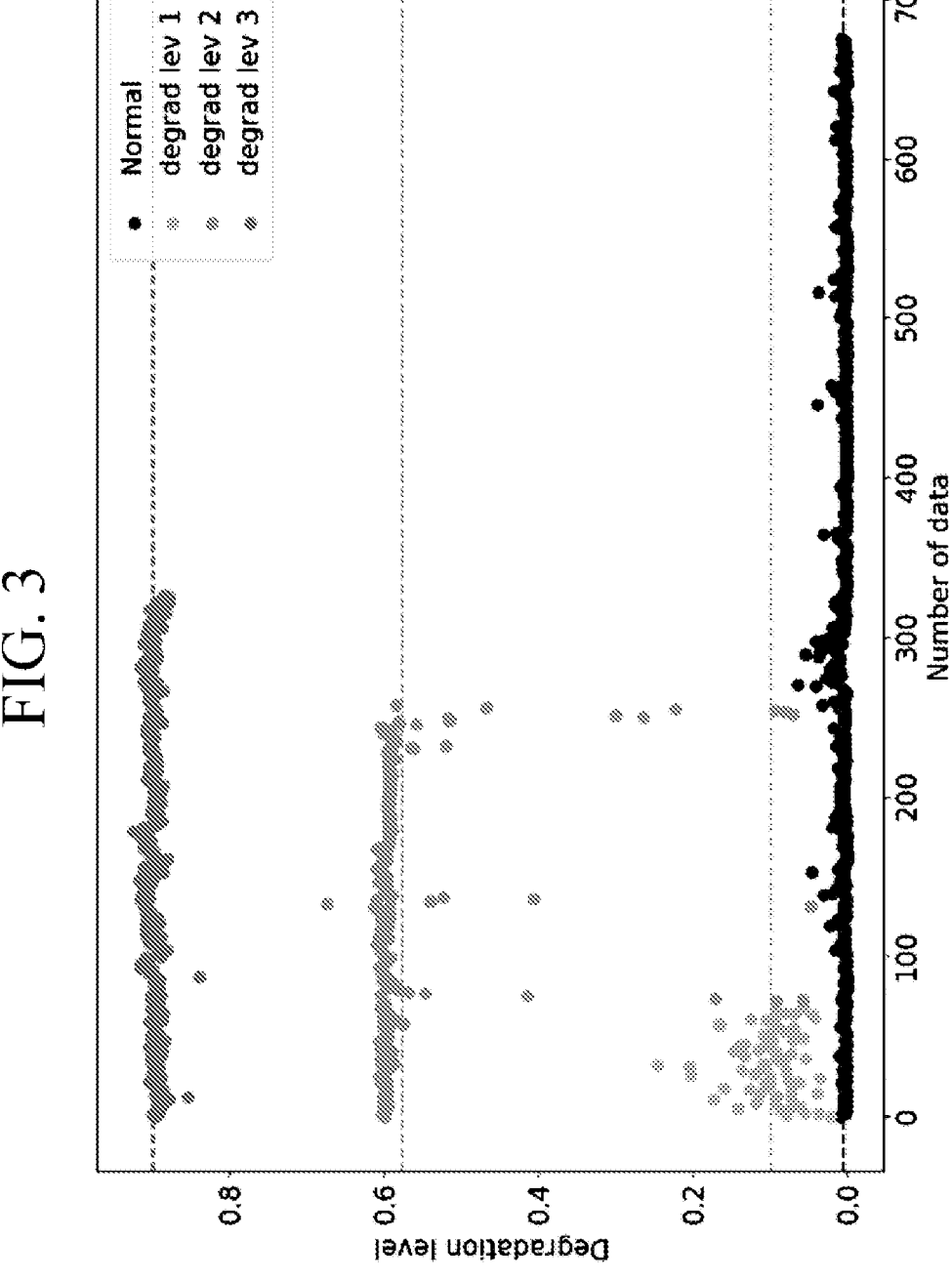
FIG. 3 is a drawing illustrating an example of the output of the state estimation model shown in FIG. 2.

FIG. 3 is a drawing illustrating an example of the output of the state estimation model shown in FIG. 2.

Referring to FIG. 3, the state estimation model 2000 may output the degree of degradation of the noise source, and in this case, the degree of degradation of the noise source may be one of the first degradation level, the second degradation level, and the third degradation level.

In the example of FIG. 2, the state estimation model 2000 may output a value indicating the degradation level of the motor reducer. If data which is output from the state estimation model 2000 is 0, it may indicate that the motor reducer is normal, and if data which is output from the state estimation model 2000 falls within a range larger than 0 and equal to or smaller than 0.1, it may indicate that the motor reducer is in a first degradation level, and if data which is output from the state estimation model 2000 falls within a range larger than 0.1 and equal to or smaller than 0.6, it may indicate that the motor reducer is in a second degradation level, and if data which is output from the state estimation model 2000 falls within a range larger than 0.6 and equal to or smaller than 1, it may indicate that the motor reducer is in a third degradation level. In this case, the first degradation level indicates a lower degree of degradation as compared to the second degradation level, and the second degradation level indicates a lower degree of degradation as compared to the third degradation level. In other words, a threshold for the first degradation level may be 0.1, and a threshold for the second degradation level may be 0.6, and a threshold for the third degradation level may be 0.9.

Referring to FIG. 3 again, most of the values output from the state estimation model 2000 having received noise point data indicating the motor reducer was normal were values close to 0.

Most of values output from the state estimation model 2000 having received noise point data (degrad lev 1) indicating that the motor reducer was in the first degradation level were values close to 0.1.

Most of values output from the state estimation model 2000 having received noise point data (degrad lev 2) indicating that the motor reducer was in the second degradation level were values close to 0.6.

Most of values output from the state estimation model 2000 having received noise point data (degrad lev 3) indicating that the motor reducer was in the third degradation level were values close to 0.9.

Referring to FIG. 3, the values output from the state estimation model 2000 have a tendency similar to that of the degrees of degradation of the noise source corresponding to the noise point data input to the state estimation model 2000. Therefore, the state estimation model 2000 may be regarded as being capable of estimating the degree of degradation of the motor reducer (noise source) with a significant degree of accuracy.

Figure 4:
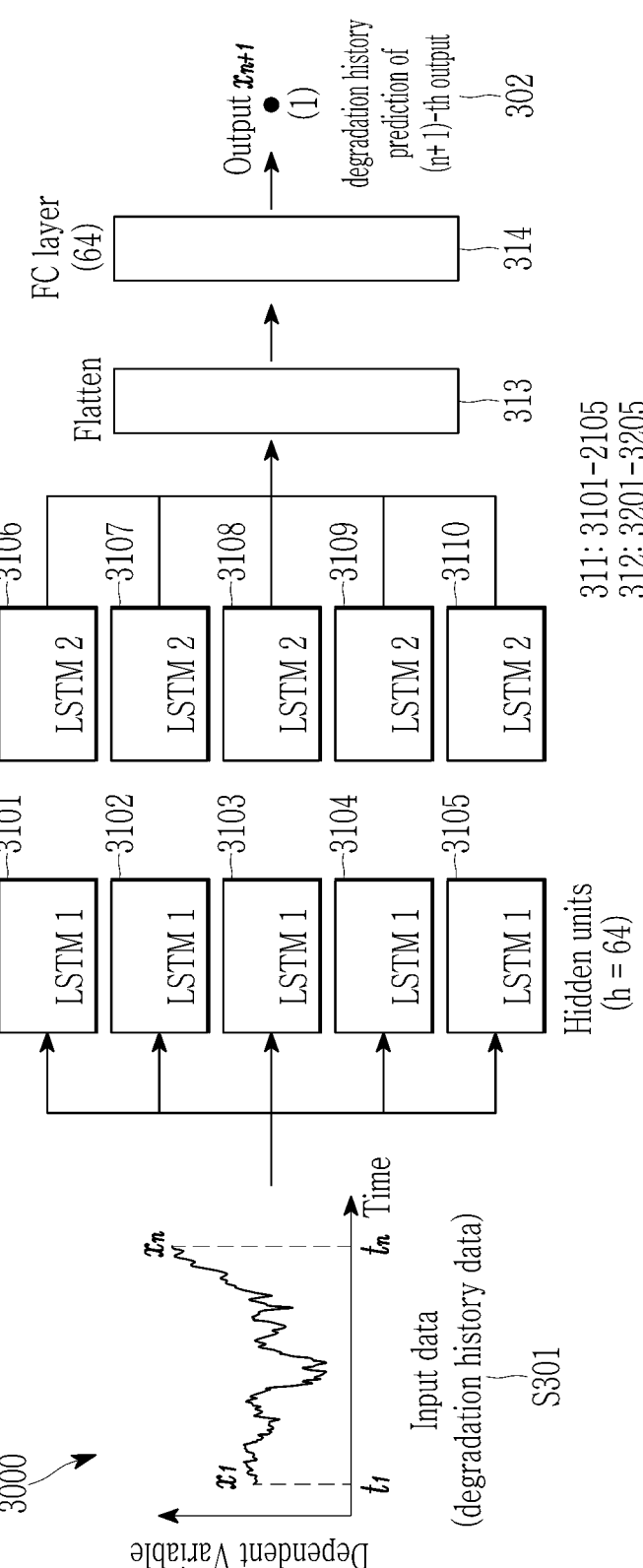
FIG. 4 is a drawing illustrating an example of a degradation prediction model in the degradation level prediction system according to the example.

FIG. 4 is a drawing illustrating an example of a degradation prediction model in the degradation level prediction system according to the example.

Referring to FIG. 4, the degradation prediction model 3000 may include a plurality of LSTM blocks 311 and 312, a flatten layer 313, and a FC layer 314.

The prediction model learning unit 300 may provide the time series degradation data to the degradation prediction model 3000, and predict degradation data indicating the degree of degradation of the noise source at a second point in time (for example, the point t_5 in time) later than a first period (for example, from the point t_0 in time to the point t_4 in time) corresponding to a plurality of consecutive first points in time, on the basis of data corresponding to the first period (for example, from the point t_0 in time to the point t_4 in time) among the time series degradation data, with respect to the LSTM type degradation prediction model 3000. The prediction model learning unit 300 may modify the degradation prediction model 3000 on the basis of an error between the data corresponding to the second point in time (for example, the point t_5 in time) among the time series degradation data and the degradation data predicted as the degree of degradation of the noise source at the second point in time (for example, the point t_5 in time).

In FIG. 4, it is shown that the number of LSTM blocks 311 and 312 is two; however, this is merely for ease of explanation, and the disclosure is not limited thereto.

The following description will be made on the assumption that in the degradation prediction model 3000 shown in FIG. 4, the epoch is 1000, and the batch size is 64, and the optimizer is Adam (lr=0.001), and the loss is a mean absolute error.

Time series degradation data $x_1$ to $x_n$ corresponding to n number of points in time belonging to the monitoring period from the point t_0 in time to the point t_n in time may be used as input data 301 for the degradation prediction model 3000. The time series degradation data $x_1$ to $x_n$ may indicate the degrees of degradation of the noise source at the points in time, respectively. For example, the data $x_1$ may indicate the degree of degradation of the noise source at the point t_1 in time, and the data $x_2$ may indicate the degree of degradation of the noise source at the point t_2 in time.

The plurality of LSTM blocks 311 and 312 may include a plurality of LSTM cells 3101 to 3110. Specifically, the LSTM block 311 may include the plurality of LSTM cells 3101 to 3105, and the LSTM block 312 may include the plurality of LSTM cells 3106 to 3110. In the plurality of LSTM cells 3101 to 3110, the data dimension size (h) value of an LSTM cell state may be 64.

Hereinafter, in the description of FIG. 4, for ease of explanation, n=5 is assumed, and in FIG. 4, it is shown that the number of LSTM cells 3101 to 3110 which is included in each of the plurality of LSTM blocks 311 and 312 is 5 corresponding to n=5; however, the disclosure is not limited thereto.

The LSTM block 311 may receive time series degradation data (for example, data $x_t$ wherein t is a natural number equal to or greater than 1 and equal to or smaller than n) corresponding to time point data indicating a point in time (for example, a point t in time) among the time series degradation data $x_1$ to $x_n$. The plurality of LSTM cells 3101 to 3105 may refer to identical cells having one parameter, and their outputs differ depending on input datum (data).

Hereinafter, an example of the configuration of each of the plurality of LSTM cells 3101 to 3110 will be described with reference to FIG. 5.

Figure 5:
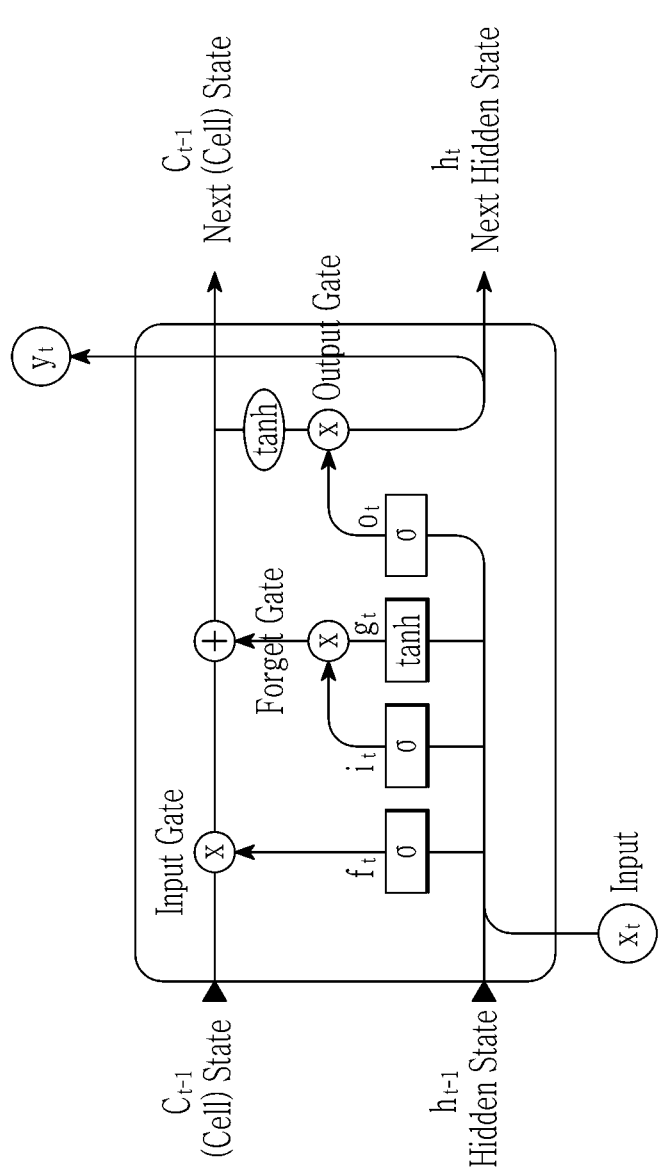
FIG. 5 is a drawing illustrating an example of a plurality of LSTM cells shown in FIG. 4.

FIG. 5 is a drawing illustrating an example of a plurality of LSTM cells shown in FIG. 4.

Referring to FIG. 5, each of the plurality of LSTM cells 3101 to 3110 may receive input data $x_t$ corresponding to the point t in time, and the long-term state $c_{t-1}$ of the previous cell, and the short-term state $h_{t-1}$ of the previous cell, and output the long-term state $c_t$ of the current cell, the short-term state $h_t$ of the current cell, and output data $y_t$. Here, the long-term states and the short-term states may indicate features in the trend of the input data $x_t$ over time. Each of the plurality of LSTM cells 3101 to 3110 may determine a weight and a bias corresponding to each of a plurality of parameters, so as to be able to output output data, a long-term state, and a short-term state corresponding to a point in time later than the point in time indicated by the input data $x_t$, on the basis of the long-term state at the previous point in time and the short-term state at the previous point in time.

Hereinafter, the operations of the plurality of LSTM cells 3101 to 3110 will be described with reference to FIG. 4 and FIG. 5.

Hereinafter, for ease of explanation, it is assumed that the input data corresponding to the plurality of LSTM cells 3101 to 3105 is the time series degradation data $x_1$ to $x_n$, and the long-term state $c_t$ corresponding to the plurality of LSTM cells 3101 to 3105 is a long-term state $c1_t$, and the short-term state $h_t$ corresponding to the plurality of LSTM cells 3101 to 3105 is a short-term state $h1_t$, and the output data $y_t$ corresponding to the plurality of LSTM cells 3101 to 3105 is output data $y1_t$. Further, it is assumed that the input data corresponding to the plurality of LSTM cells 3106 to 3110 is the output data $y1_t$ to $y1_n$ of the plurality of LSTM cells 3101 to 3105, and the long-term state $c_t$ corresponding to the plurality of LSTM cells 3106 to 3110 is a long-term state $c2_t$, and the short-term state $h_t$ corresponding to the plurality of LSTM cells 3106 to 3110 is a short-term state $h2_t$, and the output data $y_t$ corresponding to the plurality of LSTM cells 3106 to 3110 is output data $y2_t$.

The LSTM cell 3101 may receive the time series degradation data $x_1$, the long-term state $c1_0$ of the previous cell, and the short-term state $h1_0$ of the previous cell corresponding to the point t_1 in time, and output the long-term state $c1_1$ of the current cell, the short-term state $h1_1$ of the current cell, and the output data $y1_1$. The long-term state $c1_0$ of the previous cell and the short-term state $h1_0$ of the previous cell may be determined as initial information in advance.

The LSTM cell 3102 may receive the time series degradation data $x_2$, the long-term state $c1_1$ of the previous cell, and the short-term state $h1_1$ of the previous cell corresponding to the point t_2 in time, and output the long-term state $c1_2$ of the current cell, the short-term state $h1_2$ of the current cell, and the output data $y1_2$.

The LSTM cell 3103 may receive the time series degradation data $x_3$, the long-term state $c1_2$ of the previous cell, and the short-term state $h1_2$ of the previous cell corresponding to the point t_3 in time, and output the long-term state $c1_3$ of the current cell, the short-term state $h1_3$ of the current cell, and the output data $y1_3$.

The LSTM cell 3104 may receive the time series degradation data $x_4$, the long-term state $c1_3$ of the previous cell, and the short-term state $h1_3$ of the previous cell corresponding to the point t_4 in time, and output the long-term state $c1_4$ of the current cell, the short-term state $h1_4$ of the current cell, and the output data $y1_4$.

The LSTM cell 3105 may receive the time series degradation data $x_5$, the long-term state $c1_4$ of the previous cell, and the short-term state $h1_4$ of the previous cell corresponding to the point t_5 in time, and output the long-term state $c1_5$ of the current cell, the short-term state $h1_5$ of the current cell, and the output data $y1_5$.

The plurality of LSTM cells 3101 to 3105 may learn how to determine the short-term states $h1_1$ to $h1_5$, long-term states $c1_1$ to $c1_5$, and output data $y1_1$ to $y1_5$ of the cells at each point in time, on the basis of the time series degradation data $x_1$ to $x_n$, respectively. The output data $y1_1$ to $y1_5$ may be determined on the basis of the weights and biases of the input data $x_t$, the long-term states $c1_1$ to $c1_5$, and the short-term states $h1_1$ to $h1_5$.

The output data of the LSTM block 311 may be input to the LSTM block 312. The plurality of LSTM cells 3106 to 3110 may refer to identical cells having one parameter, and their outputs differ depending on input datum (data).

The LSTM cell 3106 may receive the output data $y1_1$ of the LSTM cell 3101, the long-term state $c2_0$ of the previous cell and the short-term state $h2_0$ of the previous cell corresponding to the point t_1 in time, and output the long-term state $c2_1$ of the current cell, the short-term state $h2_1$ of the current cell, and the output data $y2_1$. The long-term state $c2_0$ of the previous cell and the short-term state $h2_0$ of the previous cell may be determined as initial information in advance.

The LSTM cell 3107 may receive the output data $y1_2$ of the LSTM cell 3102, the long-term state $c2_1$ of the previous cell and the short-term state $h2_1$ of the previous cell corresponding to the point t_2 in time, and output the long-term state $c2_2$ of the current cell, the short-term state $h2_2$ of the current cell, and the output data $y2_2$.

The LSTM cell 3108 may receive the output data $y1_3$ of the LSTM cell 3103, the long-term state $c2_2$ of the previous cell and the short-term state $h2_2$ of the previous cell corresponding to the point t_3 in time, and output the long-term state $c2_3$ of the current cell, the short-term state $h2_3$ of the current cell, and the output data $y2_3$.

The LSTM cell 3109 may receive the output data $y1_4$ of the LSTM cell 3104, the long-term state $c2_3$ of the previous cell and the short-term state $h2_3$ of the previous cell corresponding to the point t_4 in time, and output the long-term state $c2_4$ of the current cell, the short-term state $h2_4$ of the current cell, and the output data $y2_4$.

The LSTM cell 3110 may receive the output data $y1_5$ of the LSTM cell 3105, the long-term state $c2_4$ of the previous cell and the short-term state $h2_4$ of the previous cell corresponding to the point t_5 in time, and output the long-term state $c2_5$ of the current cell, the short-term state $h2_5$ of the current cell, and the output data $y2_5$.

The plurality of LSTM cells 3106 to 3110 may learn how to determine the short-term states $h2_1$ to $h2_5$, long-term states $c2_1$ to $c2_5$, and output data $y2_1$ to $y2_5$ of the cells at each point in time, on the basis of the output data $y1_1$ to $y1_5$ of the plurality of LSTM cells 3101 to 3105, respectively. The output data $y2_1$ to $y2_5$ may be determined on the basis of the weights and biases of the input data $y1_1$ to $y1_5$, the long-term states $c2_1$ to $c2_5$, and the short-term states $h2_1$ to $h2_5$.

Referring to FIG. 5, each of the plurality of LSTM cells 3101 to 3110 may include an input gate, a forget gate, and an output gate, and include a forget gate layer ft, an input gate layer $i_t$, an input hyperbolic tangent layer $g_t$, and an output gate layer $o_t$.

The forget gate layer ft may indicate data output based on values obtained by applying the weights and the biases for the input data $x_t$ and the short-term state $h_{t-1}$ of the previous cell were input to a sigmoid layer $\sigma$. The forget gate layer ft may determine the weight and bias values via learning (e.g., by learning).

The input gate layer $i_t$ may indicate data output based on values obtained by applying the weights and the biases for the input data $x_t$ and the short-term state $h_{t-1}$ of the previous cell having been input to a sigmoid layer $\sigma$. The input gate layer $i_t$ may determine the weight and/or bias values via learning (e.g., by learning).

The input hyperbolic tangent layer $g_t$ may indicate data output based on values obtained by applying the weights and the biases for the input data $x_t$ and the short-term state $h_{t-1}$ of the previous cell having been input to a hyperbolic tangent layer tan h. The input hyperbolic tangent layer $g_t$ may determine the weight and/or bias values via learning (e.g., by learning).

The output gate layer $o_t$ may indicate data output based on values obtained by applying the weights and the biases for the input data $x_t$ and the short-term state $h_{t-1}$ of the previous cell having been input to a sigmoid layer $\sigma$. The output gate layer $o_t$ may determine the weight and bias values via learning (e.g., by learning).

The input gate may output a value that is the product of the long-term state $c_{t-1}$ of the previous cell and a forget gate layer ($f_t$) value.

The forget gate may multiply an input gate layer ($i_t$) value and an input hyperbolic tangent layer ($g_t$) value, and/or add the output of the input gate (the product of the long-term state $c_{t-1}$ of the previous cell and the forget gate layer ($f_t$) value) to the product, thereby updating the long-term state $c_t$ of the current cell.

The output gate may update the short-term state $h_{t-1}$ of the current cell by multiplying the data $y_t$ output based on the long-term state $c_t$ of the current cell having been input to the hyperbolic tangent layer tan h and an output gate layer ($o_t$) value.

Referring to FIG. 4 again, the flatten layer 313 may flatten the output data $y2_1$ to $y2_n$ output from the plurality of LSTM cells 3106 to 3110. The flatten layer 313 may receive the output data $y2_1$ to $y2_n$ and generate a one-dimensional vector. For example, the flatten layer 313 may receive the output data $y2_1$ to $y2_5$ and generate a one-dimensional 5-bit vector. The flatten layer 313 may generate output data by flattening n number of data into a one one-dimensional vector by dimensional transformation, while keeping the sizes of the input data the same.

The FC layer 314 may be fully connected to the flatten layer 313. Output data indicating the degree of degradation of the noise source corresponding to each of the plurality of points t_0 to t_n in time and target points in time later than the point t_n in time. The FC layer 314 may receive the output of the flatten layer 313 as input data, and output a one-dimensional vector by executing an operation on the input data. The output of the FC layer 314 may be the output of the degradation prediction model 3000.

For example, a FC layer 314 may receive a one-dimensional n-bit vector as an input, and generate a one-dimensional n-bit vector by executing an operation of Wx+b. Here, x, W, and b may indicate an input, a weight, and a bias, respectively. The FC layer 314 may determine the weight and bias values through learning.

The degradation prediction model 3000 may generate output data 302 including the time series degradation data corresponding to the predetermined monitoring period indicated by the input data 301 and time series degradation data corresponding to a predetermined prediction period later than the predetermined monitoring period and predicted from the input data 301.

The controller 400 may input first input data 301 including degradation data corresponding to at least one point in time output data among the time series degradation data $x_1$ to $x_n$ and output data (for example, the data $x_{n+1}$) output from the degradation prediction model 3000 at the previous point in time, to the degradation prediction model 3000, thereby generating output data 302 indicating the degree of degradation of the noise source corresponding to a point in time later than the point in time indicated by the first input data 301. The controller 400 may repeatedly collect output data from the degradation prediction model 3000 by delaying the time point of the input data 301 by one unit time until the point in time which is indicated by output data 302 reaches the final point in time belonging to the predetermined prediction period.

For example, if the input data 301 is the time series degradation data $x_1$ to $x_5$ corresponding to the period from the point t_0 in time to the point t_5 in time, prediction data 302 output from the degradation prediction model 3000 may include the degree of degradation of the noise source at the point t_6 in time. If the input data 301 is the time series degradation data $x_2$ to $x_6$ corresponding to the period from the point t_2 in time to the point t_6 in time, prediction data 302 output from the degradation prediction model 3000 may include the degree of degradation of the noise source at the point t_7 in time. If the predetermined prediction period is a period from the point t_6 in time to the point t_10 in time, the controller 400 may input the time series degradation data $x_4$ to $x_9$ corresponding to the period from the point t_4 in time to the point t_9 in time, to the degradation prediction model 3000, and repeatedly collect output data from the degradation prediction model 3000 until predicting the degree of degradation of the noise source at the point t_10 in time.

The controller 400 may output time series data indicating the degrees of degradation of the noise source corresponding to the predetermined monitoring period (the period from the point t_0 in time to the point t_n in time) and the predetermined prediction period (the period from the point t_(n+1)

in time to the point t_(n+k) in time, wherein k is a natural number greater than 2) (hereinafter, referred to as the "time series prediction data"), from the degradation prediction model 3000.

The time series prediction data may include data indicating the degrees of degradation of the noise source corresponding to the period from the point t_0 in time to the point t_(n+k) in time. For example, the flatten layer 313 and the FC layer 314 flatten a one-dimensional n-bit vector corresponding to the predetermined monitoring period (the period from the point t_0 in time to the point t_n in time) and a one-dimensional k-bit vector corresponding to the predetermined prediction period (the period from the point t_(n+1) in time to the point t_(n+k) in time), thereby generating time series prediction data in the form of a one-dimensional (n+k)-bit vector.

The storage unit 500 may store the time series prediction data predicted from the state estimation model 2000.

As described above, in an example, the time series degradation data output from the state estimation model 2000 may be used as learning data for learning of the degradation prediction model 3000. However, the example is not limited thereto, and in some examples, the storage unit 500 may store data indicating the degradation levels of the noise source in association with the plurality of points in time belonging to the predetermined period, and the degradation prediction model 3000 may learn how to predict data at a later point in time, from the feature of the data stored in the storage unit 500 over time, the data indicating the degradation levels of the noise source in association with the plurality of points in time.

Figure 6:
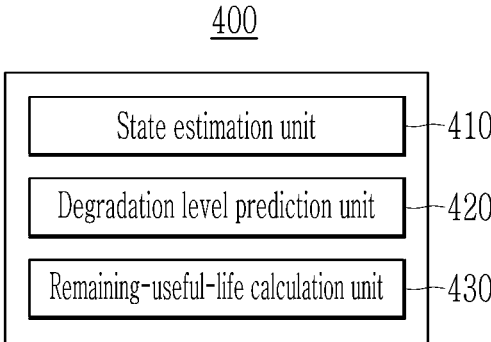
FIG. 6 is a drawing illustrating a detailed configuration of a controller shown in FIG. 1.

FIG. 6 is a drawing illustrating a detailed configuration of a controller shown in FIG. 1.

Referring to FIG. 6, the controller 400 may include a state estimation unit 410, a degradation level prediction unit 420, and/or a remaining-useful-life calculation unit 430.

The state estimation unit 410 may generate and/or train the state estimation model 2000 as described above, and/or estimate the state information of the noise source from the learned state estimation model 2000.

The degradation level prediction unit 420 may generate and/or train the degradation prediction model 3000 as described above, and predict the degree of degradation of the noise source corresponding to a target point in time, from the learned degradation prediction model 3000.

Hereinafter, the state information of the noise source estimated by the state estimation unit 410 and the degrees of degradation of the noise source predicted by the degradation level prediction unit 420 will be described with reference to FIG. 7.

Figure 7:
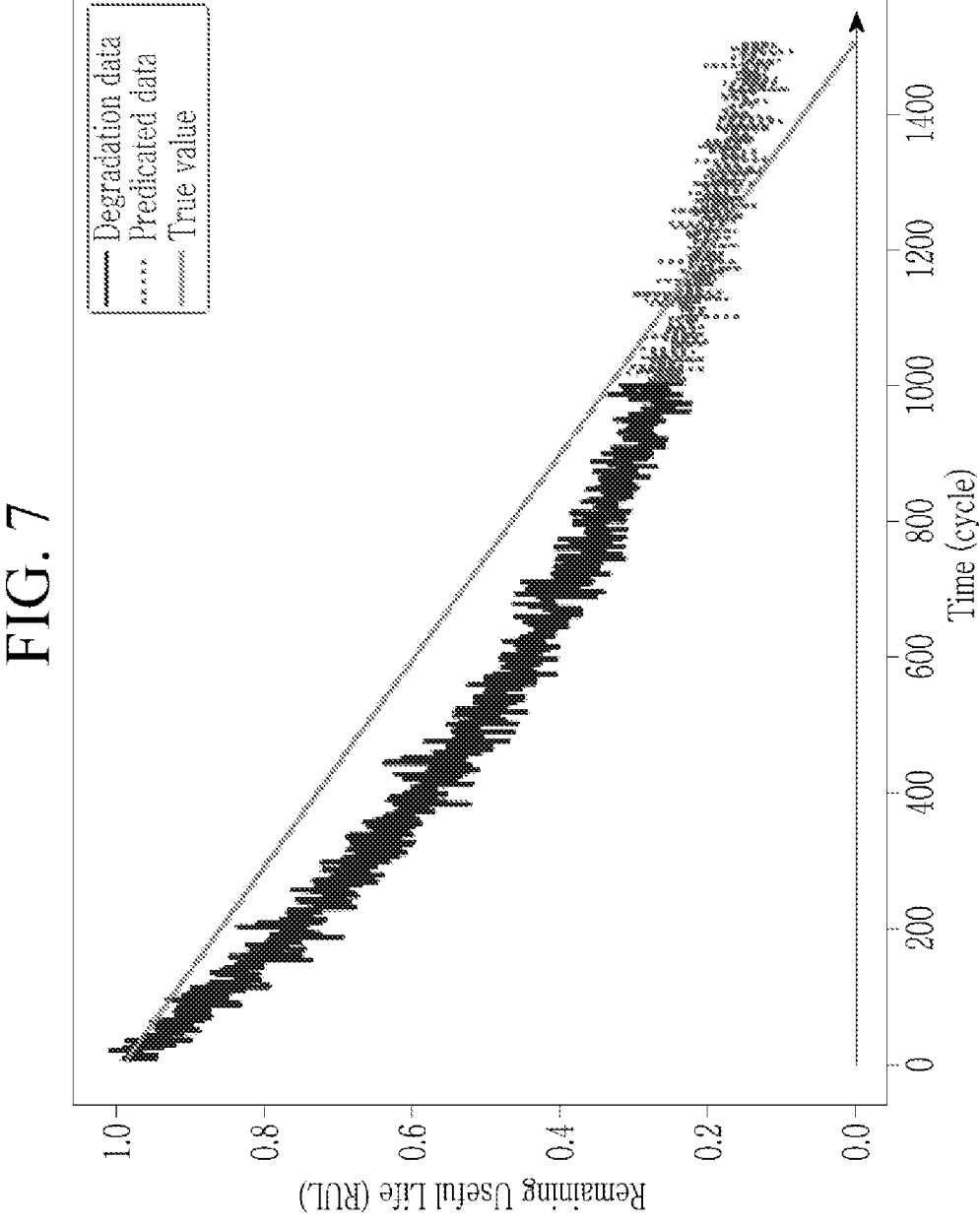
FIG. 7 is a drawing illustrating an example of a graph explaining data generated by the degradation level prediction system according to the example.

FIG. 7 is a drawing illustrating an example of a graph explaining data generated by the degradation level prediction system according to the example.

Referring to FIG. 7, remaining useful lives (RUL) corresponding to time series degradation data (Degradation Data) estimated according to the number of cycles of the vehicle corresponding to a time (Time) by the state estimation unit 410 and/or the degree of degradation of the noise source (Predicted Data) predicted by the degradation level prediction unit 420 are shown.

The following description will be made on the assumption that the input data is data corresponding to a period from the 0-th cycle to the 1000-th cycle with reference to FIG. 7.

Referring to FIG. 7, with time, the remaining useful lives (RUL) corresponding to the time series degradation data (Degradation Data) estimated in association with each point in time from the 0-th cycle to the 1000-th cycle by the state estimation unit 410 and/or the remaining useful lives (RUL) corresponding to the degrees of degradation of the noise source (Predicted Data) predicted in association with the 1000-th cycle to the 1500-th cycle by the degradation level prediction unit 420 tend to decrease.

Further, the time series degradation data (Degradation Data) and/or the degrees of degradation of the noise source (Predicted Data) may have tendencies similar to that of actual data (True value) indicating actual failure of the noise source. Therefore, in the example, estimating and predicting the degradation level of the noise source using the state estimation model 2000 and the degradation prediction model 3000 can be regarded as being possible with a significant degree of accuracy.

Referring to FIG. 6 again, the remaining-useful-life calculation unit 430 may calculate the remaining useful life at a reference point in time belonging to target points in time, on the basis of the state information of the noise source estimated by the state estimation unit 410 and the degree of degradation of the noise source predicted by the degradation level prediction unit 420.

The remaining-useful-life calculation unit 430 may perform curve fitting on the time series degradation data corresponding to the monitoring period from the point t_0 in time to the point t_n in time and the data indicating the degrees of degradation of the noise source later than the point t_n in time, thereby generating a trend graph. The remaining-useful-life calculation unit 430 may generate a trend graph corresponding to the time series prediction data by estimating a series of linear relationships of data based on the time series prediction data. The manner in which the remaining-useful-life calculation unit 430 performs curve fitting may be implemented through various algorithms.

The remaining-useful-life calculation unit 430 may calculate the remaining useful life at the current point in time, on the basis of the trend graph generated through the curve fitting and the degree of degradation of the noise source at the current point in time. The remaining-useful-life calculation unit 430 may derive the degradation level of the noise source corresponding to the reference point in time, from the trend graph. Here, the reference point in time may be one of at least one point in time belonging to the target points in time. The degradation level of the noise source derived from the trend graph may be different from the degree of degradation of the noise source at the reference point in time among the time series prediction data. This is because the trend graph is a graph generated from the time series prediction data predicted by the degradation prediction model 3000 by the curve fitting.

The remaining-useful-life calculation unit 430 may derive the remaining useful life of the noise source at the current point in time, on the basis of the degradation level of the noise source at the current point in time and the degradation level of the noise source at the reference point in time derived from the trend graph. The manner in which the remaining-useful-life calculation unit 430 calculates the remaining useful life may be implemented through various algorithms.

For example, when it is assumed that the time point of t=200 is the current point in time, the remaining-useful-life calculation unit 430 may derive the degradation level of the motor reducer at the time point of t=400, from the trend graph, and may calculate the remaining useful life of the motor reducer at the current point in time, on the basis of the degradation level of the motor reducer at the current point in time and the degradation level of the motor reducer at the time point of t=400.

FIG. 8 is a flow chart of a degradation level prediction method according to an example.

The degradation level prediction system 10 has been described, and hereinafter, a redundant description thereof will not be made. A degradation level prediction method to be described below may be a method which is performed by at least one processor included in the degradation level prediction system 10.

Referring to FIG. 8, the sensors may collect vibration signals from the noise point (S100).

The sensors may collect vibration signals at the noise point. The input unit 100 may acquire the collected vibration signals from the sensors.

The controller 400 may convert the vibration signals into data in the frequency domain (S200).

The estimation model learning unit 200 may generate and train the state estimation model 2000 to estimate the degradation level through deep learning under control of the controller 400 (S300).

The estimation model learning unit 200 may determine the state estimation model 2000 on the basis of learning data in which noise point data indicating vibration signals at a first point in time is labeled with the degree of degradation of the noise source at the first point in time.

The state estimation unit 410 may estimate the time series degradation data indicating the degrees of degradation of the noise source corresponding to the unit times on the basis of the learned state estimation model 2000 during the monitoring period from the point t_0 in time to the point t_n in time, and store the estimated data in the storage unit 500 (S400). The state estimation unit 410 may provide the time series frequency data corresponding to the monitoring period from the point t_0 in time to the point t_n in time, to the state estimation model 2000, and acquire the time series degradation data output from the state estimation model 2000.

The prediction model learning unit 300 may generate and train the degradation prediction model 3000 to predict the degradation state of the noise source at a target point in time later than the current point in time through deep learning under control of the controller 400 (S500).

The prediction model learning unit 300 may determine the degradation prediction model 3000 on the basis of the time series degradation data output from the state estimation model 2000.

The degradation level prediction unit 420 may predict the degrees of degradation of the noise source corresponding to target points in time later than the point t_n in time on the basis of the learned degradation prediction model 3000, and store the predicted data in the storage unit 500 (S600).

The degradation level prediction unit 420 may provide the time series degradation data to the degradation prediction model 3000, and derive the time series prediction data output from the degradation prediction model 3000. The degradation prediction model 3000 may flatten the time series degradation data and the degrees of degradation of the noise source at the target points in time belonging to the prediction period later than the monitoring period indicated by the time series degradation data, thereby generating the time series prediction data.

The remaining-useful-life calculation unit 430 may calculate the remaining useful life of the noise source at the current point in time on the basis of the state information of the noise source estimated by the state estimation unit 410 and the degree of degradation of the noise source predicted by the degradation level prediction unit 420 (S700).

The remaining-useful-life calculation unit 430 may generate the trend graph corresponding to the time series prediction data, from the time series prediction data. The remaining-useful-life calculation unit 430 may calculate the remaining useful life at the current point in time, on the basis of the trend graph generated through the curve fitting and the degree of degradation of the noise source at the current point in time.

The remaining-useful-life calculation unit 430 may derive the degradation level corresponding to the reference point in time, from the trend graph. The remaining-useful-life calculation unit 430 may derive the remaining useful life of the noise source at the current point in time, on the basis of the degradation level of the noise source at the current point in time and the degradation level of the noise source at the reference point in time derived from the trend graph.

The present disclosure attempts to provide a degradation level prediction method and a degradation level prediction system capable of measuring noise detected from a noise point in a vehicle, and estimating the degradation level of the noise source on the basis of the measured noise, and predicting a degradation level at a time point in the future.

A method according to a feature of the present disclosure is a degradation level prediction method which is performed on a noise point generating noise by at least one processor, and includes a step of determining a state estimation model by performing deep learning using a plurality of frequency data items indicating a plurality of vibrations of the noise point during a predetermined period and a plurality of degradation data items indicating the degrees of degradation of the noise point (and/or noise source) during the predetermined period, a step of measuring a plurality of first vibration signals at the noise point during a monitoring period, a step of estimating time series degradation data indicating the degrees of degradation of the noise point (and/or noise source) during the monitoring period by inputting a plurality of first frequency data items in a frequency domain, obtained by converting the plurality of first vibration signals, to the state estimation model, a step of determining a degradation prediction model by performing deep learning using the time series degradation data, a step of predicting degradation data indicating the degrees of degradation of the noise point (and/or noise source) of at least one target point in time belonging to a prediction period later than the monitoring period, from the degradation prediction model, and a step of calculating the remaining useful life of the noise source on the basis of the time series degradation data and the degradation data at the target point in time.

The step of determining the state estimation model may include a step of providing a frequency data item indicating a vibration measured from the noise point at a first point in time, as an input, to the state estimation model, a step of predicting a first degradation data item indicating the degree of degradation of the noise point (and/or noise source) according to the frequency data item at the first point in time, and a step of modifying the state estimation model according to an error between the data item indicating the degree of degradation of the noise point (and/or noise source) at the first point in time and the first degradation data item.

The step of determining the degradation prediction model may include a step of providing the time series degradation data, as an input, to the degradation prediction model, a step of predicting a first degradation data item indicating the degree of degradation of the noise point (and/or noise source) at a second point in time later than a first period corresponding to a plurality of consecutive first points in time, according to data corresponding to the first period among the time series degradation data, in a long short-term memory (LSTM) manner, and a step of modifying the degradation prediction model according to an error between data corresponding to the second point in time among the time series degradation data and the first degradation data item.

The step of predicting the degradation data indicating the degrees of degradation of the noise point (and/or noise source) may include a step of generating time series prediction data by flattening the time series degradation data and data indicating the degrees of degradation of the noise point (and/or noise source) corresponding to the prediction period.

The step of calculating the remaining useful life of the noise source may include a step of generating a trend graph corresponding to the time series prediction data by performing curve fitting on the time series prediction data, a step of deriving a first degradation level of the noise source corresponding to one reference point in time among the target points in time, from the trend graph, and a step of calculating the remaining useful life of the noise source at the current point in time, on the basis of the degradation level of the noise source at the current point in time and the first degradation level of the noise source.

A degradation level prediction system according to another feature of the present disclosure includes an input unit that acquires vibration signals from a noise point where noise is generated, an estimation model learning unit that determines a state estimation model by performing deep learning using a plurality of frequency data items indicating a plurality of vibrations of the noise point during a predetermined period and a plurality of degradation data items indicating the degrees of degradation of the noise point (and/or noise source) during the predetermined period, and a controller that measures a plurality of first vibration signals at the noise point during a monitoring period, and estimates time series degradation data indicating the degrees of degradation of the noise point (and/or noise source) during the monitoring period by inputting a plurality of first frequency data items in a frequency domain, obtained by converting the plurality of first vibration signals, to the state estimation model, and predicts degradation data indicating the degrees of degradation of the noise point (and/or noise source) of at least one target point in time belonging to a prediction period later than the monitoring period, from a degradation prediction model performing deep learning using the time series degradation data, and calculates the remaining useful life of the noise source on the basis of the time series degradation data and the degradation data at the target point in time.

The estimation model learning unit may provide a frequency data item indicating a vibration measured from the noise point at a first point in time, as an input, to the state estimation model, and predict a first degradation data item indicating the degree of degradation of the noise point (and/or noise source) according to the frequency data item at the first point in time, and modify the state estimation model according to an error between the data item indicating the degree of degradation of the noise point (and/or noise source) at the first point in time and the first degradation data item.

The degradation level prediction system may further include a prediction model learning unit that provides the time series degradation data, as an input, to the degradation prediction model of a long short-term memory (LSTM) type, and predicts a first degradation data item indicating the degree of degradation of the noise point (and/or noise source) at a second point in time later than a first period corresponding to a plurality of consecutive first points in time, according to data corresponding to the first period among the time series degradation data, and modifies the degradation prediction model according to an error between data corresponding to the second point in time among the time series degradation data and the first degradation data item.

The degradation prediction model may generate time series prediction data by flattening the time series degradation data and data indicating the degrees of degradation of the noise point (and/or noise source) corresponding to the prediction period.

The controller may generate a trend graph corresponding to the time series prediction data by performing curve fitting on the time series prediction data, and derive a first degradation level of the noise source corresponding to one reference point in time among the target points in time, from the trend graph, and calculate the remaining useful life of the noise source at the current point in time, on the basis of the degradation level of the noise source at the current point in time and the first degradation level of the noise source.

According to the present disclosure, it is possible to determine an abnormality in a vehicle drive system, using a vibration signal of a noise point.

According to the present disclosure, it is possible to more accurately estimate an abnormality in a vehicle drive system from vibration of a noise point, using a deep learning model.

According to the present disclosure, real-time data is used in a vehicle drive system in actual operation. Therefore, it is possible to estimate the degradation state of a part of a vehicle reflecting the current state of the vehicle, and predict a degradation point in time in the future or estimate the remaining useful life at a point in time in the future.

According to the present disclosure, it is possible to accurately determine degradation in a vehicle drive system such that it is possible to cope with the degradation. Accordingly, it is possible to reduce the time and cost required for vehicle maintenance.

According to the present disclosure, as a result, the comfort of driving of vehicle drivers can be improved, and the satisfaction of vehicle users can be improved.

While this present disclosure has been described in connection with what is presently considered to be practical examples, it is to be understood that the present disclosure is not limited to the disclosed examples. On the contrary, it is intended to cover various modifications and equivalent arrangements included within the spirit and scope of the appended claims.

What is claimed is:

1. A method comprising:
determining a state estimation model by performing deep learning using:
a plurality of frequency data items indicating a plurality of vibrations of a noise source during a predetermined period, and
a plurality of degradation data items indicating corresponding degrees of degradation of the noise source during the predetermined period;
measuring a plurality of first vibration signals, from the noise source, at a noise point during a monitoring period;
estimating, by the state estimation model, time series degradation data indicating degrees of degradation of the noise source during the monitoring period by inputting a plurality of first frequency data items, obtained by converting the plurality of first vibration signals into a frequency domain, into the state estimation model;

determining a degradation prediction model by performing second deep learning using the time series degradation data estimated by the state estimation model as a training input for the second deep learning;

predicting, based on the degradation prediction model, degradation data indicating degrees of degradation of the noise source at at least one target point in time within a prediction period later than the monitoring period; and calculating, based on the time series degradation data and the degradation data at the target point in time, a remaining useful life of the noise source.

2. The method of claim 1, wherein the determining the state estimation model comprises:

providing a frequency data item, indicating a vibration measured at the noise point at a first point in time, as an input to the state estimation model;

predicting a first degradation data item indicating a first degree of degradation of the noise source according to the frequency data item at the first point in time; and modifying the state estimation model based on an error between a data item indicating the degree of degradation of the noise source at the first point in time and the first degradation data item.

3. The method of claim 1, wherein the determining the degradation prediction model comprises:

providing the time series degradation data, as an input, to the degradation prediction model;

predicting, via the degradation prediction model, a first degradation data item indicating a second degree of degradation of the noise source at a second point in time later than a first period corresponding to a plurality of consecutive first points in time, according to data corresponding to the first period among the time series degradation data; and modifying the degradation prediction model according to an error between data corresponding to the second point in time among the time series degradation data and the first degradation data item.

4. The method of claim 3, wherein the degradation prediction model comprises a long short term memory (LSTM) model.

5. The method of claim 1, wherein the predicting the degradation data indicating the degrees of degradation of the noise source comprises generating time series prediction data by flattening the time series degradation data and data indicating the degrees of degradation of the noise source corresponding to the prediction period.

6. The method of claim 5, wherein the calculating the remaining useful life of the noise source comprises:

generating a trend graph corresponding to the time series prediction data by performing curve fitting on the time series prediction data;

deriving a first degradation level of the noise source corresponding to one reference point in time, among the at least one target point in time, from the trend graph; and determining, based on degradation level of the noise source at a current point in time and the first degradation level of the noise source, the remaining useful life of the noise source at the current point in time.

7. The method of claim 1, wherein the noise source comprises one or more of a motor reducer, a brake, or a tire.

8. A degradation level prediction system comprising:

an input unit configured to acquire vibration signals from a noise point configured to measure noise from a noise source;

an estimation model learning unit configured to determine a state estimation model by performing deep learning using:

a plurality of frequency data items indicating a plurality of vibrations of the noise point during a predetermined period, and a plurality of degradation data items indicating degrees of degradation of the noise source during the predetermined period; and a controller configured to:

measure a plurality of first vibration signals at the noise point during a monitoring period, estimate, by the state estimation model based on a plurality of first frequency data items input into the state estimation model, time series degradation data indicating degrees of degradation of the noise source during the monitoring period, wherein the plurality of first frequency data items are obtained by converting the plurality of first vibration signals into a frequency domain, predict, via a degradation prediction model performing second deep learning using the time series degradation data estimated by the state estimation model as a training input for the second deep learning, degradation data indicating a degree of degradation of the noise source at at least one target point in time within a prediction period later than the monitoring period, and calculate, based on the time series degradation data and the predicted degradation data at the at least one target point in time, a remaining useful life of the noise source.

9. The degradation level prediction system of claim 8, wherein the estimation model learning unit is configured to:

provide a frequency data item, indicating a vibration measured at the noise point at a first point in time, as an input to the state estimation model, predict a first degradation data item indicating the degree of degradation of the noise source according to the frequency data item at the first point in time, and modify the state estimation model according to an error between a data item indicating a degree of degradation of the noise source at the first point in time and the first degradation data item.

10. The degradation level prediction system of claim 8, further comprising:

a prediction model learning unit configured to:

provide the time series degradation data as an input to the degradation prediction model, predict, based on data corresponding to a first period among the time series degradation data, a second degradation data item indicating a degree of degradation of the noise source at a second point in time later than the first period, wherein the first period corresponds to a plurality of consecutive first points in time, and modify the degradation prediction model according to an error between a portion of the time series degradation data corresponding to the second point in time and the second degradation data item.

11. The degradation level prediction system of claim 10, wherein the degradation prediction model comprises a long short term memory (LSTM) model.

12. The degradation level prediction system of claim 8, wherein the degradation prediction model is configured to generate time series prediction data by flattening the time series degradation data and data indicating the degrees of degradation of the noise source corresponding to the prediction period.

13. The degradation level prediction system of claim 12, wherein the controller is configured to:

generates a trend graph corresponding to the time series prediction data by performing curve fitting on the time series prediction data, derive, based on the trend graph, a first degradation level of the noise source corresponding to one reference point in time among the at least one target point in time, and calculate, based on degradation level of the noise source at a current point in time and the first degradation level of the noise source, the remaining useful life of the noise source at the current point in time.

14. The degradation level prediction system of claim 8, wherein the noise source comprises one or more of a motor reducer, a brake, or a tire.

15. The degradation level prediction system of claim 8, wherein the state estimation model is configured to estimate, based on vibration data associated with a vehicle component generating noise and a location of the vehicle component, a state of the vehicle component.

16. The degradation level prediction system of claim 11, wherein the LSTM model is configured to learn a temporal pattern of the time series degradation data.

17. The method of claim 1, wherein the state estimation model is configured to estimate, based on vibration data associated with a vehicle component generating noise and a location of the vehicle component, a state of the vehicle component.

18. The method of claim 4, wherein the LSTM model is configured to learn a temporal pattern of the time series degradation data.

19. The method of claim 1, wherein state estimation model is configured to perform a learning process to learn a correlation between vibration frequency data and degradation states, and wherein the degradation prediction model is configured to perform a learning process to learn temporal patterns of the time-series degradation data estimated by the state estimation model.

* * * * *